United States Patent Office 3,153,051
Patented Oct. 13, 1964

3,153,051
PROCESS FOR THE PREPARATION OF ORGANIC CYCLIC CARBONATES AND PRODUCTS PREPARED THEREBY
Minerva F. Kormendy, Plymouth Meeting, and Bernard Loev, Broomall, Pa., assignors to Smith Kline & French Laboratories, Philadelphia, Pa., a corporation of Pennsylvania
No Drawing. Filed May 31, 1963, Ser. No. 284,391
7 Claims. (Cl. 260—340.2)

This invention relates to a novel process for the preparation of organic cyclic carbonates and to certain novel organic cyclic carbonates prepared thereby.

Many 1,2-diols having pharmacodynamic activity such as muscle relaxant, tranquilizing, anti-convulsant and general central nervous system depressant activity are known to the art. By the process of this invention 1,2-diols are converted to organic cyclic carbonates which have generally the same kind of activity as the parent 1,2-diols.

The process of this invention comprises reacting a 1,2-diol compound such as a vic-glycol or a benzene-o-diol with an excess of sodium cyanate and an excess of trifluoroacetic acid to give organic cyclic carbonates. The diol compound is preferably reacted with about 2–4 molar equivalents of sodium cyanate and about 2–4 molar equivalents of trifluoroacetic acid.

The reaction is carried out at temperatures of about 15–50° C. for a reaction period of about 2–24 hours, preferably at about 30° C. for about 10–16 hours, in an inert organic solvent preferably a hydrocarbon such as benzene or toluene, an ether such as diethyl ether or tetrahydrofuran or a halogenated hydrocarbon such as methylene chloride. The presence of a small amount of water in the reaction mixture is advantageous and results in increased yields of the product.

The process of this invention is generally applicable to prepare organic cyclic carbonates from a wide variety of 1,2-diols. For example, according to the process of this invention organic cyclic carbonates having the formula:

(Formula I)

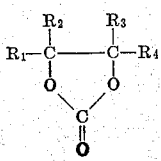

when:

$R_1$, $R_2$, $R_3$ and $R_4$ are members selected from the group consisting of hydrogen, lower alkyl, phenyl, benzyl, phenethyl, phenoxymethyl and N-heterocyclic rings and, when taken together with the carbon atoms to which they are attached, form an aromatic ring, are prepared by reacting a 1,2-diol having the formula:

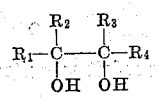

when $R_1$, $R_2$, $R_3$ and $R_4$ are as defined above with an excess of sodium cyanate and an excess of trifluoroacetic acid.

When mercapto or additional hydroxy groups are present in the 1,2-diols said groups are converted to thiolcarbamates and carbamates respectively under the above described reaction conditions. Functional groups, such as olefins, ethers, sulfides and tertiary amines, which may be present in the 1,2-diols are unreactive in the process of this invention.

Further objects of this invention are novel organic cyclic carbonates prepared by the process of this invention and represented by the following formula:

(Formula II)

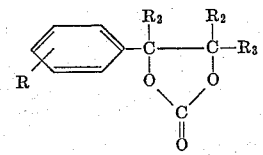

when:

R represents halogen having an atomic weight of less than 80 or trifluoromethyl and
$R_1$, $R_2$ and $R_3$ represent lower alkyl.

These novel organic cyclic carbonates have pharmacodynamic activity, in particular muscle relaxant, anticonvulsant and tranquilizing activity.

The following examples are not limiting but are illustrative of the process and compounds of this invention. Various changes and modifications may be made in carrying out the process of this invention without departing from the spirit and scope thereof. Insofar as these changes and modifications are within the purview of the appended claims they are considered as part of our invention.

*Example 1*

A mixture of 2.0 g. of 2-(p-chlorophenyl)-3-methyl-2,3-butanediol and 1.2 g. of sodium cyanate is treated with 2.06 g. of trifluoroacetic acid and 75 ml. of ether. After 1.5 hours at room temperature, additional ether is added and the mixture is allowed to stand overnight at room temperature. The mixture is treated with water, neutralized with sodium bicarbonate and extracted with ether. The ether extracts are rinsed with 5% sodium bicarbonate solution and with water and ether. After the ether extracts are dried, filtered and concentrated and the residue is chromatographed using benzene-tetrahydrofuran on neutral alumina, the product is 2-(p-chlorophenyl)-3-methyl-2,3-butanediol cyclic carbonate, M.P. 77–80° C.

*Example 2*

To the Grignard reagent prepared from 113 g. of p-bromo-α,α,α-trifluorotoluene and 12.5 g. of magnesium turnings in 1000 ml. of ether is added 21 g. of 2-methyl-2-hydroxy-3-butanone in 50 ml. of ether at a rate to allow refluxing to proceed slowly. The mixture is stirred overnight and treated first with 100 ml. of a saturated ammonium chloride solution and then with 100 ml. of 2 N hydrochloric acid. After stirring for 30 minutes, the ethereal layer is separated and concentrated in vacuo to give a solid which is recrystallized from cyclohexane, a mixture of methanol-water, and a mixture of cyclohexane and benzene. White needles of 2-(p-trifluoromethylphenyl)-3-methyl-2,3-butanediol are obtained, M.P. 98–99° C.

A solution of 3.75 g. of 2-(p-trifluoromethylphenyl)-3-methyl-2,3-butanediol in dichloromethane is treated with 1.95 g. of sodium cyanate and 3.45 g. of trifluoroacetic acid. The resulting mixture is allowed to stand overnight at room temperature. The mixture is washed with 20 ml. of water, dried, filtered and concentrated. The residue is dissolved in cyclohexane and benzene and filtered. The filtrate is chromatographed through neutral alumina in benzene to give the cyclic carbonate of 2-(p-trifluoromethylphenyl)-3-methyl-2,3-butanediol, M.P. 71–74° C.

*Example 3*

A mixture of 2.6 g. of 2-(p-bromophenyl)-3-methyl-2,3-butanediol (prepared by the procedure of Example 2 using 1-bromo-4-iodobenzene as the starting material), 1.3 g. of sodium cyanate and 2.4 g. of trifluoroacetic acid in ether is allowed to stand at 30° C. for 16 hours to give after working up as in Example 1, 2-(p-bromophenyl)-3-methyl-2,3-butanediol cyclic carbonate.

Similarly from 2-(o-chlorophenyl)-3-methyl-2,3-butanediol (prepared by the procedure of Example 2 using 1-chloro-2-bromobenzene as the starting material) the cyclic carbonate is prepared.

*Example 4*

By the procedure of Example 1 the following 1,2-diols are reacted at room temperature with sodium cyanate and trifluoroacetic acid in ether:

2-(m-chlorophenyl)-3-methyl-2,3-butanediol
2-(p-fluorophenyl)-3-methyl-2,3-butanediol
2-(m-chlorophenyl)-3-methyl-2,3-pentanediol to give:

2-(m-chlorophenyl)-3-methyl-2,3-butanediol cyclic carbonate
2-(p-fluorophenyl)-3-methyl-2,3-butanediol cyclic carbonate and
2-(m-chlorophenyl)-3-methyl-2,3-pentanediol cyclic carbonate, respectively.

*Example 5*

A mixture of 1.8 g. of 3-(o-toloxy)-1,2-propanediol, 1.3 g. of sodium cyanate and 2.3 g. of trifluoroacetic acid in ether is stirred at room temperature for six hours. Working up as in Example 1 gives 3-(o-toloxy)-1,2-propanediol cyclic carbonate.

*Example 6*

Two grams of 3-(o-methoxyphenoxy)-1,2-propanediol, 1.5 g. of sodium cyanate and 2.5 g. of trifluoroacetic acid in 50 ml. of dichloromethane are mixed and the mixture is allowed to stand at room temperature for 16 hours to give, after working up as in Example 1, the cyclic carbonate of 3-(o-methoxyphenoxy)-1,2-propanediol.

*Example 7*

A mixture of 16.6 g. of 4-tertiary butylpyrocatechol, 13.0 g. of sodium cyanate and 22.8 g. of trifluoroacetic acid in ether is allowed to stand at room temperature for 15 hours to give, after working up as in Example 1, the cyclic carbonate of 4-tertiary butyl pyrocatechol.

*Example 8*

By the procedure of Example 2, 2-bromothiophene is treated with magnesium in ether and the resulting Grignard reagent is reacted with 2-methyl-2-hydroxy-3-butanone to give 3-methyl-2-(2-thienyl)-2,3-butanediol.

A mixture of 9.3 g. of 3-methyl-2-(2-thienyl)-2,3-butanediol, 6.5 g. of sodium cyanate and 11.4 g. of trifluoroacetic acid in 75 ml. of ether is kept at room temperature for 14 hours. Working up as in Example 1 gives 3-methyl-2-(2-thienyl)-2,3-butanediol cyclic carbonate.

*Example 9*

By the procedure of Example 1, a mixture of 1.7 g. of 2,3,6-trimethyl-2,3-heptanediol, 1.3 g. of sodium cyanate and 2.3 g. of trifluoromethylacetic acid is allowed to stand at 30° C. for 14 hours to give, after working up, the cyclic carbonate of 2,3,6-trimethyl-2,3-heptanediol.

What is claimed is:

1. The process of preparing organic cyclic carbonates which comprises reacting a member selected from the group consisting of a vic-glycol and a benzene-o-diol with an excess of sodium cyanate and an excess of trifluoroacetic acid.

2. The process according to claim 1 in which the reaction is carried out in an inert organic solvent.

3. The process according to claim 2 in which the reaction is carried out at 15–50° C.

4. The process of preparing organic cyclic carbonates having the formula:

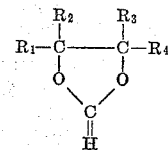

in which:

$R_1$, $R_2$, $R_3$ and $R_4$ are members selected from the group consisting of hydrogen, lower alkyl, phenyl, benzyl, phenethyl, phenoxymethyl and N-heterocyclic rings and, when taken together with the carbon atoms to which they are attached, form an aromatic ring which comprises reacting a 1,2-diol having the formula:

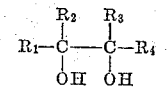

in which $R_1$, $R_2$, $R_3$ and $R_4$ are as defined above with an excess of sodium cyanate and an excess of trifluoroacetic acid.

5. A compound having the formula:

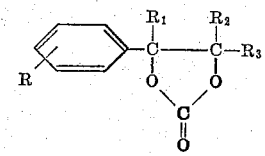

in which:

R is a member selected from the group consisting of halogen having an atomic weight of less than 80 and trifluoromethyl and $R_1$, $R_2$ and $R_3$ are lower alkyl.

6. A compound having the formula:

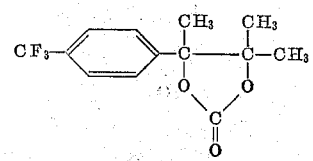

7. A compound having the formula:

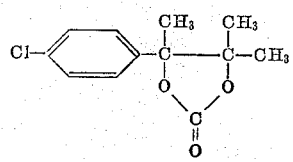

No references cited.